J. P. CULVER & T. H. WALSH.
Pipe-Joint.

No. 217,927. Patented July 29, 1879.

Witnesses
Frank A. Brooks
S. H. Nourse

Inventors
John P. Culver
Thaddeus H. Walsh
by Dewey & Co.
attys

N. PETERS, PHOTO-LITHOGRAPHER, WASHINGTON, D. C.

UNITED STATES PATENT OFFICE.

JOHN P. CULVER, OF SAN FRANCISCO, CALIFORNIA, AND THADDEUS H. WALSH, OF NEW YORK, N. Y.

IMPROVEMENT IN PIPE-JOINTS.

Specification forming part of Letters Patent No. 217,927, dated July 29, 1879; application filed June 16, 1879.

*To all whom it may concern:*

Be it known that we, JOHN P. CULVER, of the city and county of San Francisco, and State of California, and THADDEUS H. WALSH, of the city and State of New York, have invented an Improved Pipe-Joint; and we hereby declare the following to be a full, clear, and exact description thereof.

Our invention relates to certain improvements in the construction of asphaltum or cement pipes; and it consists in a novel method of forming the meeting ends and joints of such pipes, so that we are enabled to make a cold-lead-calked joint without breaking or disturbing the substance of the pipe.

In the construction of this class of pipes it has been common to form them of a volute of thin veneer or of sheet-iron, which is wound upon a mandrel, with a layer or coating of asphaltum between, whereby a coiled pipe is formed consisting of alternate coils of veneer or iron and asphaltum. These pipes are made in sections, and have hitherto been made with a metallic tongue and groove at the meeting ends of the pipes, which have been covered with a coating of asphaltum and an exterior iron band or sleeve when laid.

Our invention contemplates the employment of an exterior band of iron, which incloses and protects the ends of the tubes or pipes, so that we are enabled to form a cold-lead or calked joint upon these asphaltum pipes in the same manner as with iron pipes.

Figure 1:
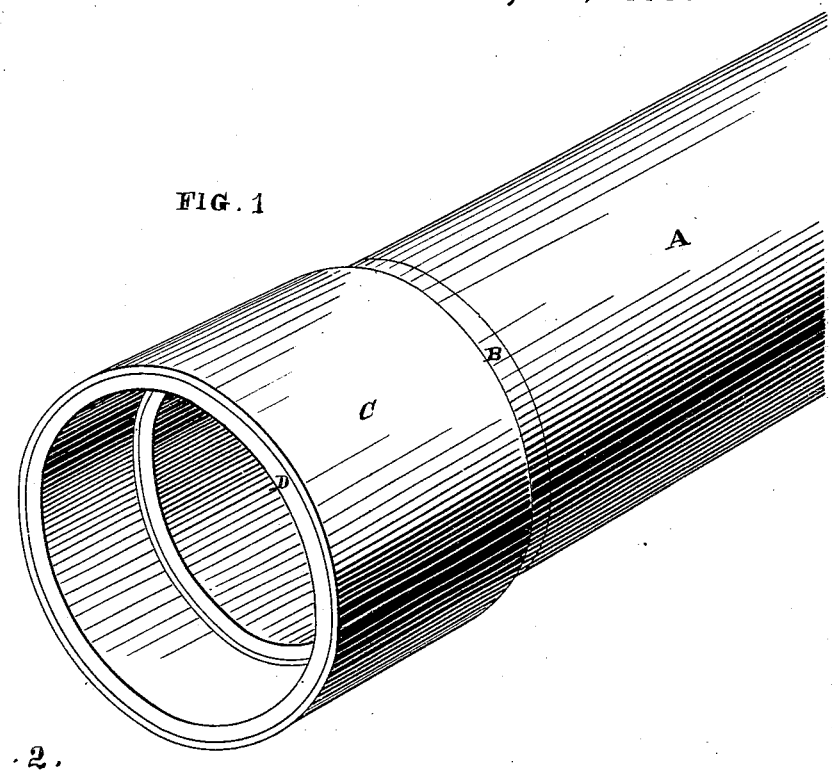
Figure 2:
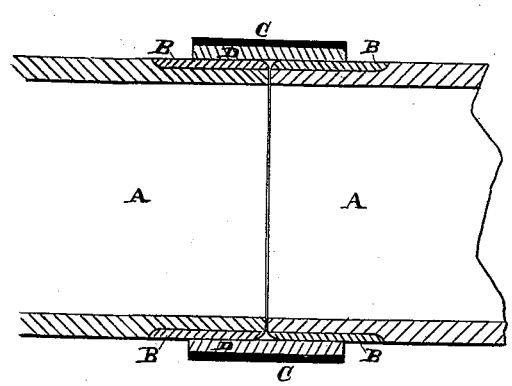
Figure 3:
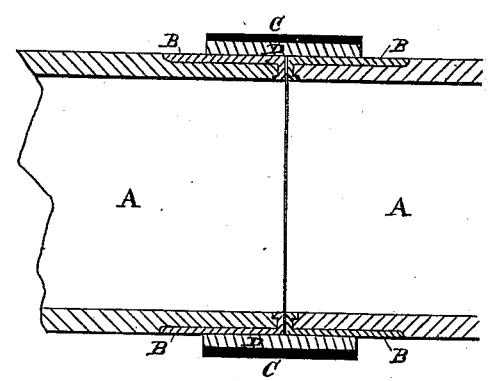
Figure 4:
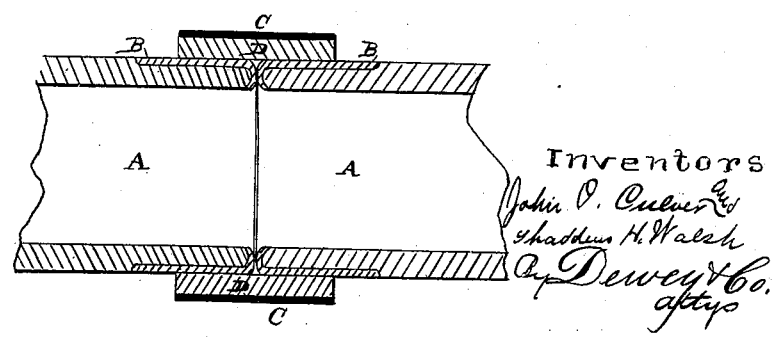

Referring to the accompanying drawings for a more complete explanation of our invention, Figure 1 is a perspective view of our pipe-joint. Fig. 2 is a section of the same. Figs. 3 and 4 are modifications.

A is a section of asphaltum pipe, formed in any suitable manner in lengths, which are afterward united to form a continuous pipe when laid.

B is a metallic band, which is placed upon the end of the pipe, outside and embedded into the asphaltum, extending back to a considerable distance. This band may be plain, as shown in Fig. 1, or it may be flanged, so as to form a cap, which will protect the end of the pipe, and this will, in many cases, be preferable.

C is a sleeve, of iron, made somewhat larger than the bands B, and this band is properly supported around a mandrel of the size of the exterior of the pipe of the bands B. The space between the sleeve and the mandrel is then filled with molten lead or other soft packing metal, D, and when cool the sleeve with its lining of soft metal is removed from the mandrel. It may then be slipped upon one of the bands B to about half its length, and by calking secured firmly in place water-tight.

When the pipe is to be laid one end of each pipe is slipped into the open end of the sleeve upon the next section, and the lead or soft-metal packing is then calked, so as to make a tight joint; or, if desired, the sleeves may be placed upon the pipes only when the pipes are to be laid.

The bands B serve as a protection to the ends of the pipes in handling, and they enable us to calk the soft metal which lines the sleeve, so as to form a perfectly tight joint without cracking or breaking, or in any way damaging, the asphaltum pipe.

Having thus described our invention, we do not claim, broadly, the employment of the inclosing-sleeve with its soft-metal packing, as we are aware that it has been employed to form joints in metal pipes; but

What we do claim as new, and desire to secure by Letters Patent, is—

The asphaltum or cement pipe A, having the bands B fitted to its ends, as shown, in combination with the sleeve C and the soft-metal lining D, whereby a cold-calked joint may be formed upon asphaltum pipes, substantially as herein described.

In witness whereof we have hereunto set our hands.

JOHN P. CULVER.
THADDEUS H. WALSH.

Witnesses:
FRANK A. BROOKS,
S. H. NOURSE.